No. 751,295. PATENTED FEB. 2, 1904.
H. F. JONES.
FLUID PRESSURE WEIGHING SCALE.
APPLICATION FILED MAY 14, 1903.
NO MODEL.
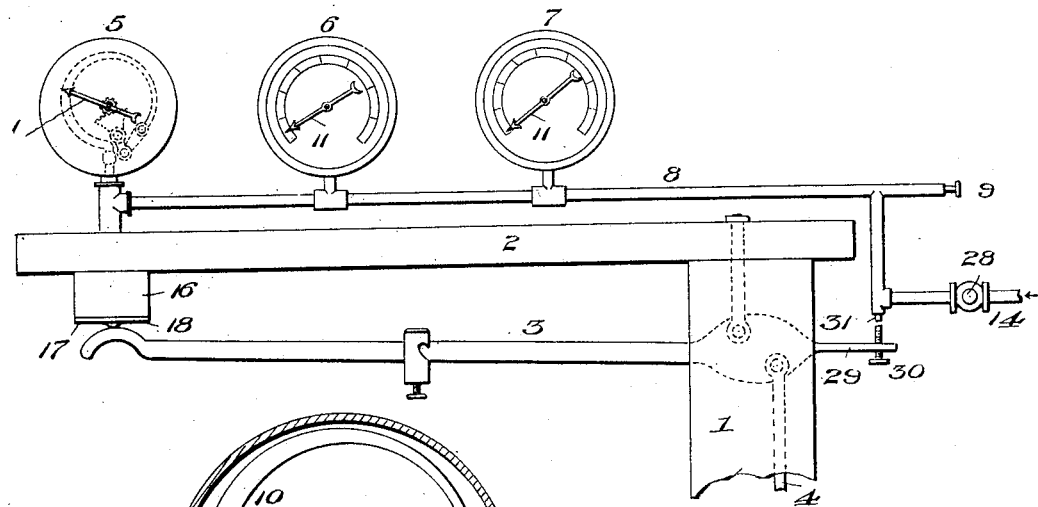
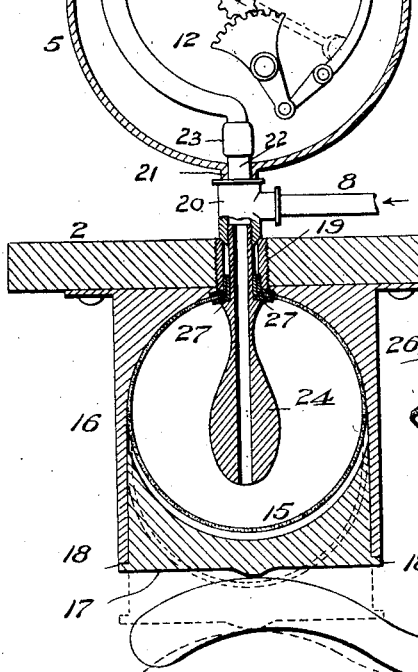
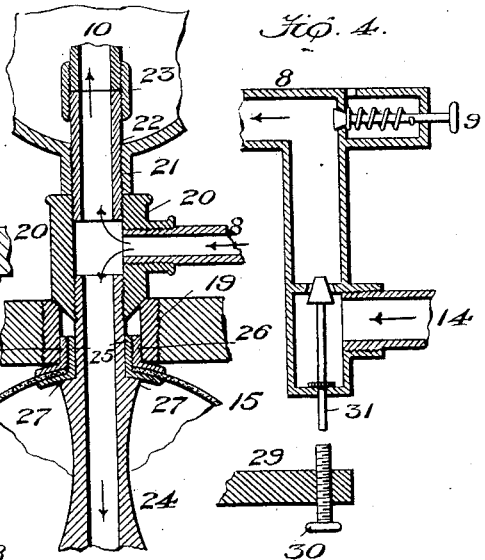

No. 751,295. Patented February 2, 1904.

UNITED STATES PATENT OFFICE.

HOWARD FEILD JONES, OF WILSON, NORTH CAROLINA.

FLUID-PRESSURE WEIGHING-SCALE.

SPECIFICATION forming part of Letters Patent No. 751,295, dated February 2, 1904.

Application filed May 14, 1903. Serial No. 157,118. (No model.)

*To all whom it may concern:*

Be it known that I, HOWARD FEILD JONES, a citizen of the United States of America, residing at No. 315 Broad street, city of Wilson, in the county of Wilson and State of North Carolina, have invented certain new and useful Improvements in Fluid-Pressure Weighing-Scales, of which the following is a specification.

This invention, which relates to weighing-machines, contemplates the production of a new and improved scale more especially designed for use in connection with a weight-receiving platform and its connected beam, although no limitation as to type of weighing appliance is intended. Neither do I intend to confine myself to the specific construction shown and hereinafter described, as various modifications may be made herein without departing from the spirit of the invention.

Broadly considered, my invention consists in the employment of fluid-pressure means interposed between an element, which may be the usual scale-beam, and a gage for indicating the weight of the article, and, further, in means by which the adjustments and operation are effected in an automatic manner.

The details of construction and operation of one form of scale embodying my invention will now be set forth in connection with the accompanying drawings, in which—

Figure 1 shows in elevation a beam platform-scale embodying my improvements. Fig. 2 is an enlarged vertical sectional view of a fluid-pressure gage and fluid-pressure means of operating it. Fig. 3 is an enlarged vertical section showing the means for securing the fluid-pressure means and the gage to the scale-arm. Fig. 4 is a sectional view, enlarged, showing the fluid-controlling valve and the fluid-pressure-releasing valve.

Referring to the drawings, 1 designates the post of a platform-scale, 2 is the arm, and 3 is the beam pivotally supported from the arm and connected by the link 4 to the rising and falling platform mechanism (not shown) in the usual manner.

The compressed fluid employed to transmit motion from the platform to the pointer of the gage, and which may be air or the like, is supplied from a suitable tank or reservoir (not shown) to preferably a series of gages 5, 6, and 7 through a pipe 8, supported from the arm 2 and provided with a hand-controlled valve 9 to vent the pipe, gages, and compressing means to restore the parts to their normal positions after each weighing operation. The gages are of the Bourdon type, each having a curved fluid spring-pipe 10, a hand or pointer 11, and any of the usual pinion-and-rack devices 12 and 13 to effect the rotation of the pointer to denote in connection with a dial the weight of the article.

Connected to the pipe 8, and consequently communicating with the supply-pipe 14, is a dilatable and collapsible bulb 15, contained within a casing 16, depending from the arm, the upper end of the casing conforming interiorly to the contour of the upper portion of the bulb. The casing extends at its lower end below the bulb, and in said lower end is slidably confined a plunger or follower 17, having a concave inner face and provided with shoulders 18, which latter by contact with the lower end of the casing limit the upward movement of the plunger.

A simple construction for mounting the fluid-pressure means and the gage is shown in Fig. 3 and consists in providing the arm with a fixed sleeve 19, within the upper end of which is seated a beveled ground-joint T-coupling 20, on the upper end of which the gage-casing is mounted by a neck extension 21 and a tube 22, screwed therein and into the upper end of the T-coupling. The tube 22 extends within the gage-casing and is joined to the end of the gage-spring fluid-pipe by a screw-coupling 23, making a tight joint. The means for securing the dilatable and collapsible bulb within its casing serves also to bind the ground-joint of the T-coupling upon the fixed arm-sleeve and to provide communication between the dilatable and collapsible bulb and the gage-spring fluid-pipe, the compressed air for expanding the rubber bulb and the gage-spring pipe being supplied by the supply-pipe 8, entering the T-coupling between the mouth of the bulb and the gage-pipe. The rubber bulb is provided with an opening through which is inserted an open-ended tube 24, the upper end of which passes through the sleeve and is screwed into the seating end of the T-coupling. Within the bulb-opening a pair of angle-rings, an inner one 25 and an outer one 26, are secured, the outer ring being screwed over the inner ring, and the edges of the bulb-opening are clamped between a flange or lip projecting outward from the lower edge of each ring. These rings are closely fitted within the lower end of the fixed arm-sleeve, while the inner ring fits close upon the tube within the sleeve and upon a shoulder 27, formed around the tube, so that in assembling the parts the bulb and the tube are grasped by the hand and the tube inserted into the fixed sleeve and screwed into the coupling. This draws the rings up and binds the outer one hard against the end of the fixed sleeve and the beveled end of the coupling hard upon the upper end of the fixed sleeve, making sealed joints at the bulb connection.

In operation, compressed air being admitted to the gages and bulb or rubber chamber, the latter is expanded to move the plunger downward, and with it the free end of the beam with which it is in engagement, until an even balance of the beam is obtained, as shown by dotted lines in Fig. 2. The air-supply is then cut off either by hand, in which event a valve 28 is provided in the supply-pipe, or preferably this is accomplished automatically by the following means: A rearward extension 29 of the beam is provided which has a regulatable screw 30 in the path of a valve 31 in the supply-pipe, whereby in the balancing position of the beam the valve 31 is engaged by the screw and maintained closed. Weight now being applied to the platform the free end of the beam is elevated, carrying with it the plunger or follower to its highest point or contact with the bulb. Air is now admitted and the bulb begins to expand, and pressing down the follower carries with it the beam until the balanced position is obtained. At this movement the set-screw 30 will engage the valve and cut off the air-supply to the bulb, leaving the beam in balanced position, when the pressure-gage will indicate the pressure upon the free end of the beam. A single gage may be employed in lieu of the series shown, but by use of the series of gages shown, which have varying capacity and varying strength of spring for small, medium, and extremely large weights, an increase in the accuracy of the scale is obtained. After each weighing operation the air is exhausted from the bulb by the vent-valve 9 sufficiently to allow the beam and other parts to return to normal postions.

The invention comprises a flexible air-chamber connected with a source of air or fluid supply, a gage to denote the amount of compression, and the flexible portion of said air-chamber resting normally in contact with the free end of the beam of platform-scales, so that whatever pressure may be admitted to the air-chamber to depress or balance the uplifted end of the beam-scale will show accurately upon the pressure mechanism of the gage. For instance, if fifty pounds upon the platform will be overcome or lifted by a pressure of one pound within the air-chamber upon the free end of beam then five hundred pounds upon the platform will require ten pounds of fluid-pressure within the flexible air-chamber pressing upon the beam. As air is elastic, pressing equally in all directions, any suitable pressure gage or measure will accurately weigh the article upon the platform.

An adjustable tare weight is movable upon the beam for the purpose of balancing the scale with any desired tare weight, so that the pressure upon the beam by the flexible air-chamber will be the net amount of the article to be weighed, so that the pressure by the fluid upon the free end of scale-beam will be the maximum pressure required to balance the beam.

It is important to note that the upper part of the case fits snugly the sphere of the rubber bulb and will not allow the sphere to expand in a great degree against the walls of the case; but the balancing-weight of the follower being movable and upheld normally by the beam can be moved down by the expansion of the rubber bulb pressing upon the beam.

Obviously the vent-valve may be of the push-button type and is self-closing, as shown, while the valve which controls the flow of the pressure fluid to the gage and the dilatable bulb may be of any suitable construction by which it may be maintained normally open, as shown, so that the valve would not be retained in its seat after the pressure from the set-screw has been removed. In the construction shown the downward pressure of the air upon the collar of the valve-stem and the weight of the valve would be sufficient for the purpose.

I claim—

1. In a weighing-scale and in combination, means arranged to be moved by a weight, a fluid-pressure-operated gage, a bulb suspended over said means and dilatable to transmit thereto the force of such dilation, a coupling affording communication between the dilatable bulb and the gage, and a valve-controlled fluid-pressure-supply pipe connected with said coupling and controlled by the movement of that said weight-moved means.

2. In combination, a fluid-pressure-operated gage, a dilatable bulb in communication with said gage, a fluid-pressure-supply pipe in communication with the bulb and gage, said pipe having a cut-off valve, a plunger at the bulb, and an element arranged to be moved by a weight to move the plunger against the dilated bulb and to seat said valve.

3. In combination, a fluid-pressure-operated gage, a dilatable bulb in communication with said gage, a fluid-pressure-supply pipe in communication with the bulb and gage, a normally open cut-off valve, and a normally closed hand-operated vent-valve in said pipe, a plunger at the bulb, and an element movable by a weight to move the plunger against the dilated bulb and to seat the cut-off valve.

4. In combination, a fluid-pressure-operated gage, a dilatable bulb in communication with said gage, a fluid-pressure-supply pipe in communication with the bulb and gage, a hand-valve controlling the supply of fluid-pressure to said pipe, a hand-controlled vent-valve and a normally unseated cut-off valve in said pipe, a plunger at the bulb, and a weighing-beam movable by a weight to move the plunger against the dilated bulb and to seat the cut-off valve.

5. In combination, a fluid-pressure-operated gage, a dilatable bulb in communication with said gage, a fluid-pressure-supply pipe in communication with the bulb and gage, a hand-valve controlling the supply of fluid-pressure to said pipe, a hand-controlled vent-valve and a normally unseated cut-off valve in said pipe, a plunger at the bulb, means for limiting the range of movement of the plunger, a weighing-beam movable by a weight to move the plunger against the dilated bulb and an adjustable shoulder on the beam adapted in the movement of the latter to engage and seat the cut-off valve.

6. In combination, fluid-pressure-operated gages, a fluid-pressure-supply pipe in communication with said gages, a hand-controlled vent-valve and a normally unseated cut-off valve in said pipe, a dilatable bulb in communication with said pipe and gages, a plunger at said bulb, and a weighing-beam movable at its forward end to engage and move the plunger against the dilated bulb and having a rearward extension provided with an adjustable shoulder for engaging and seating the cut-off valve.

7. In weighing-scales and in combination, a weighing-beam, a fluid-pressure-operated gage, a bulb dilatable from a fixed point of suspension over the free end of the beam, a coupling affording communication between the dilatable bulb at its point of suspension and the gage, and a controllable fluid-pressure-supply pipe connected with said coupling, the relation of the beam and the bulb being such as to cause the free end of the beam to be depressed by the dilation of the bulb.

8. In combination, a fluid-pressure-operated gage, a dilatable bulb in communication with said gage, a closure from the top of which said bulb is suspended, a plunger forming the bottom of said closure, a fluid-pressure-supply pipe in communication with said gage and dilatable bulb, and the weighing-beam, the latter receiving the pressure produced by the dilation of the bulb upon the plunger.

9. In weighing-scales and in combination, a beam arranged to be moved by a weight, a fluid-pressure-operated gage, a flexible bulb dilated from a fixed point of suspension over the free end of the beam, means affording communication between the dilatable bulb and the gage, means for dilating the bulb and means to exhaust the bulb.

10. In a weighing-scale, weight-moved means, a dilatable bulb suspended over said means, a fluid-pressure-operated gage, a supply-pipe in communication with the bulb, the gage and the source of supply, means automatically to cut off the supply, and a normally closed hand-operated vent-valve for exhausting the bulb.

In testimony whereof I affix my signature in presence of two witnesses.

HOWARD FEILD JONES.

Witnesses:
   A. E. H. JOHNSON,
   GUY H. JOHNSON.